United States Patent
Kinoshita

(10) Patent No.: US 6,933,646 B2
(45) Date of Patent: Aug. 23, 2005

(54) ELECTRIC ROTATING MACHINE AND ELECTROMAGNETIC MACHINE AND APPARATUS

(76) Inventor: Yuki Kinoshita, 7-8, Mikanohara-cho 2-chome, Hitachi-shi, Ibaraki 316-0026 (JP)

( * ) Notice: Subject to any disclaimer, the term of this patent is extended or adjusted under 35 U.S.C. 154(b) by 0 days.

(21) Appl. No.: 10/230,298

(22) Filed: Aug. 29, 2002

(65) Prior Publication Data

US 2003/0042815 A1 Mar. 6, 2003

(30) Foreign Application Priority Data

Aug. 30, 2001 (JP) .................................. 2001-261406

(51) Int. Cl.[7] .............................. H02K 1/06; H02K 1/12
(52) U.S. Cl. ...................... 310/179; 310/216; 310/49 R
(58) Field of Search ................................ 310/42, 49 R, 310/49 A, 191, 192, 180, 179, 216, 218, 257

(56) References Cited

U.S. PATENT DOCUMENTS

| | | | | |
|---|---|---|---|---|
| 452,717 A | * | 5/1891 | Riker | 310/259 |
| 1,905,660 A | * | 4/1933 | Platen | 310/160 |
| 2,243,318 A | * | 5/1941 | Rawlings | 310/263 |
| 3,855,486 A | * | 12/1974 | Binder et al. | 310/49 R |
| 4,355,248 A | * | 10/1982 | Manson | 310/42 |
| 4,820,951 A | * | 4/1989 | Sugiura et al. | 310/257 |
| 4,824,734 A | * | 4/1989 | Takajo | 428/570 |
| 5,194,773 A | * | 3/1993 | Clarke | 310/112 |
| 5,274,291 A | * | 12/1993 | Clarke | 310/112 |
| 5,309,051 A | * | 5/1994 | Kobori | 310/49 R |
| 6,121,712 A | * | 9/2000 | Sakamoto | 310/254 |
| 6,145,187 A | * | 11/2000 | Kliman | 29/596 |
| 6,177,751 B1 | * | 1/2001 | Suzuki et al. | 310/269 |
| 6,411,003 B1 | * | 6/2002 | Sasaki et al. | 310/156.02 |
| 6,441,531 B1 | * | 8/2002 | Horng et al. | 310/216 |

* cited by examiner

*Primary Examiner*—Thanh Lam
*Assistant Examiner*—David W. Scheuermann
(74) *Attorney, Agent, or Firm*—Antonelli, Terry, Stout & Kraus, LLP

(57) ABSTRACT

To simplify a winding structure of a stator and a rotor of an alternating current electric machine, in a winding a magnetic field formation of a magnetic pole portion is formed with a bobbin structure. In a structural aspect, an eddy current is lessened in an alternating magnetic field. An iron core is formed with a module work and has a reduced metal die cost and it correspond to an alternation in pole number and an iron core having different capacity.

23 Claims, 23 Drawing Sheets

A-O-B Cutting View

A-O-B Cutting View

Cutting

ELECTRIC ROTATING MACHINE AND ELECTROMAGNETIC MACHINE AND APPARATUS

BACKGROUND OF THE INVENTION

1. Technical Field

The present invention relates to an electric rotating machine and an electromagnetic machine and apparatus and further relates to an electric motor, a generator and an electromagnetic machine and apparatus in which magnets and electromagnets are used singly or together with.

A magnetic pole structure, a winding structure and a combination theseof in which an output improvement, and an adjustment improvement, and an efficiency improvement can be improved, and further a productivity of a magnetic pole iron core and an electric work etc. can be made rapid progress.

Further, the present invention relates to a technical field in which an efficiency during a low speed and a low output of the electric rotating machine can be made rapid progress and a heat withstanding performance for forming a compact and a light weight structure can be increased to twice.

2. Prior Art

A member in a stator of a conventional generator and a conventional electric motor and a member in a conventional wound rotor are manufactured by assembling a winding in slots, which are provided in laminated electromagnetic steel plates as winging insertions.

After the winding assembling work finish, winding end portions are connected and a formation and a fixing of an end coil are complicated and difficult work and become high from a cost aspect and a work process becomes long.

Accordingly, it invites a lowering in reliability of an insulation destroy in a use such as the work and a twine and an interference in a narrow slot and between the windings, a lowering (ordinary 50%) in a slot occupation rate for making a work performance of an assembly wire performance, a cost-up according to an extension of an end coil, an increase of a resistance loss of an end coil portion accompanied by the above and an efficiency lowering and an output lowering etc. according to an increase etc. of leakage magnetic flux.

Further, a machinery performance of a production is difficult and much equipment cost for carrying out the above is needed. Further, in a case of a low voltage and a middle and a large capacity electric rotating machine a diameter of a winding becomes large and then a work performance becomes further worse and a cost-up becomes widely. This is similar to a case of a single-phase wound motor.

When the pole number is intended to alter in the conventional structure, the winding number is altered, except for a case where an outer form of the iron core is formed specially large, in ordinary an eight-pole structure is the limit. In a case of a magnet type electric motor or generator, an output adjustment, a start torque adjustment, and an efficiency-up adjustment are carried out mainly by the adjustment in the winding or the adjustment of the strength of the magnet.

Further, the pole number alternation of a magnet iron core portion is constituted structurally and fixedly to the outer periphery of the rotor but only the polarity alternation of the magnet is carried out. The iron core is generally constituted according to the integral lamination but there is no divisional system.

To reduce the start torque, the lamination iron core of the stator and the rotor is constituted in a straight form in a circumferential direction or is skewed with a zigzag form. In this case, there is no structure according to the divisional system of the iron core.

Relating to the magnet, the integral structure is generally but there are no divisional system and a combination of a magnetic body and a non-magnetic body in which a magnetic force is adjusted.

Further, a conventional electric rotating machine having an iron core winding structure used in a ultra-super high temperature environment has the limit of 250° C. in a temperature in which a periphery temperature and a temperature rise value of the coil.

In the conventional electric rotating machine, the efficiency during a low speed and during a low output is very low, this is generally from 20° C. to 30° C. even in a conventional magnet type electric rotating machine.

SUMMARY OF THE INVENTION

Accordingly, according to a winding and an iron core structure and constructions of a stator and a rotor of an alternative current generator and an electric motor, etc. the present invention is to provide the technical problems which are (1) the simplification of the winding structure according to the iron core structure, material, and construction, and (2) the realization of the innovative efficiency-up during the low output according to the rapid progress improvement of the start improvement.

Further, the present invention is to provide the technical problems which are, (3) the structure realization of the iron core and the magnet enable to correspond the various kinds and the small productions, and (4) the realization of an electric rotating machine having a high heat withstanding and an electric rotating machine having a compact type and a light weight structure.

According to the present invention, a single-phase electric rotating machine and an electromagnetic machine and apparatus having a single-phase iron core being applied to a bobbin type winding, among plural iron cores, a relative angle of a part or all of magnetic poles is altered from zero degree to several degrees, thereby a voltage adjustment and an output adjustment are carried out by keeping pace of a series state and a parallel state of the winding and a change-over a tap.

According to the present invention, an electric rotating machine and an electromagnetic machine and apparatus having a bobbin type winding electromagnet structure, from two-pole to N pole is altered freely by an installation manner of a magnetic pole piece.

According to the present invention, an electromagnet structure having an iron core used in a bobbin type winding, to reduce an eddy current of an iron core in a pole piece and a yoke portion, said iron core is constituted by one selected from a surrounding metal fittings and a lamination iron core, an iron core constituted by a thin wire member, a vessel and a ferro-powdered iron core, and a thick material having plural thin grooves.

According to the present invention, an electric rotating machine and an electromagnetic machine and apparatus having an iron core which is constituted integrally in an inner peripheral direction of an iron core used in a bobbin winding, to lessen a magnetism of resistance gone across between pole pieces of different poles, in a part of a yoke portion, said iron core is constituted by one selected from a surrounding metal fittings and a lamination iron core, an iron core constituted by a thin wire member, a vessel and a ferro-powdered iron core, and a thick material having piurai thin grooves.

According to the present invention, an electric rotating machine and an electromagnetic machine and apparatus having a bobbin winding iron core, to make smoothly a flow of magnetic field of mutual poles said iron core is arranged in a radial direction and is combined with a wedge shape iron core.

According to the present invention, an electric rotating machine and an electromagnetic machine and apparatus comprising a magnet type stator having a module and divided iron core or a magnet type rotor having a module and divided iron core, from two-pole to N pole is altered freely according to a magnet insertion manner, and a characteristic is altered freely according to a construction alternation of a strength and a cancellation using a magnetic body including a magnet, a magnetic shunt steel and a non-magnetic body.

According to the present invention, an electric rotating machine and an electromagnetic machine and apparatus comprising a magnet type stator having a module and divided iron core or a magnet type rotor having a module and divided iron core, a start adjustment or a characteristic adjustment is carried out by one selected from a short-circuit ring and a bridge using a magnetic body including a magnetic shunt steel and a non-magnetic body.

According to the present invention, an electric rotating machine and an electromagnetic machine and apparatus having a module and divided iron core, by replacing a cut-off portion with a non-magnetic body in a part of said divided iron core core, a cut-off shaped skew groove of said divided iron core is carried out to function effectively a skew effect.

According to the present invention, an electric rotating machine and an electromagnetic machine and apparatus having a magnet insertion space of an iron core in which a skew is formed by mounting a magnet, using said magnet insertion space to form the skew a magnet and an opened space are combined with a wedge shape magnetic body.

According to the present invention, an electric rotating machine and an electromagnetic machine and apparatus comprising a zigzag shape iron core which has formed a skew effect using a magnetic pole iron core, to not generate a magnetic short circuit between adjacent mutual iron cores, using only said delicate zigzag iron core a skewing is omitted.

According to the present invention, an electric rotating machine and an electromagnetic machine and apparatus having a magnet type rotor or a magnet type stator, an iron core for constituting a skew unit and a single or plural module thin magnets are combined.

DESCRIPTION OF THE INVENTION

Figure 1A:
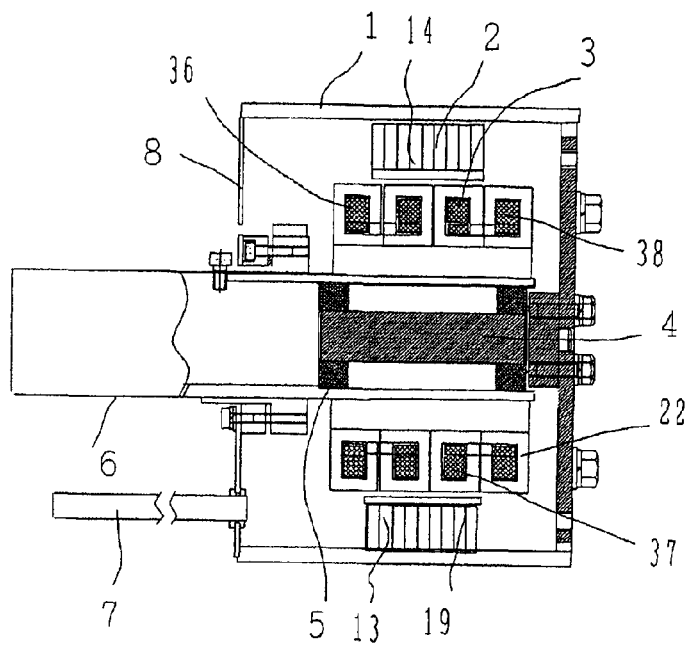
FIG. 1A is a structural view showing one embodiment of an outer rotation type generator having a stator which is constituted by a bobbin type electromagnet according to the present invention.

Hereinafter, the embodiments for carrying out the invention will be explained by exemplifying an outer rotation type generator referring to the drawings.

FIG. 1A is an outer rotation type generator and a cross-sectional structure of the generator according to the present invention having a stator 3 which is constituted by a bobbin type electromagnet and a rotor 2 constituted by a magnet 14.

When the rotor 2 is driven outside by a power drive source, to coils 36, 37 and 38 etc. wounded in the stator 3, the voltage generates in response to the rotation number, and to an electric power taken-out cord 7 when the loads such as the resistance are connected the current flows and the electric power is supplied. The generation voltage is proportional to the magnetic flux of an air gap formed between the stator 3 and the rotor 2 and also proportional to the rotation number.

The present invention shows an example of the construction in which the bobbin type structure stator 3 is used to construct by four iron cores 22, the coils 36, 37, 37 and 38.

The material of the iron core 22 is made by the ferro-group sintering material in which the eddy current hardly flows against the alternating current magnetic field, the combination of the laminating component of plural electromagnetic steel sheets in which the productivity is taken into consideration, or the combination of the laminating component of the sintering material and the electromagnetic steel sheets, etc.

In the inner portion of the iron core 22, a coil having the high occupying property is wounded fully with the wind thread on a bobbin, which is formed with a reel shape and has the electrically high insulation property. The wire winding-into work to this reel is carried out by mounting many reels in a shaft of the electric motor and then the wire assembling work is finished once by the winding.

This manner has the particular differences in comparison with the conventional assembling work for assembling to the lamination iron core and introduces cheap in a production cost and has a superior reliability in an insulation performance.

Next, relating to the bobbin type electromagnet according to the present invention, the iron core structure, the stator structure and the winding structure of the electric motor and the generator will be explained referring to the drawings.

Figure 2A:
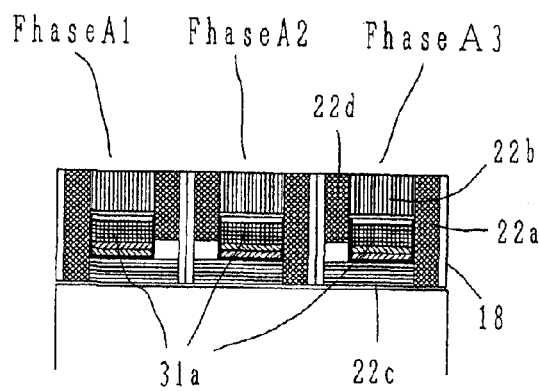
FIGS. 2A–2D are structural explanatory views of an electromagnet which is used a single phase twelve-pole electric rotating machine having a bobbin type winding iron core and a winding type rotor.
Figure 2B:
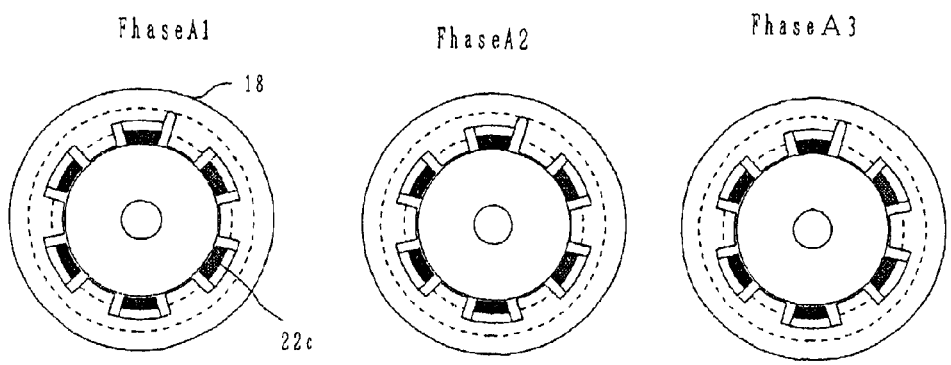

Each of FIGS. 2A and 2B shows an electromagnet used in a stator and a wound rotor of a single-phase twelve-pole electric rotating machine. FIG. 2A shows a cross-sectional view of a single-phase stator, which is constituted by three electromagnets of from A1-phase to A3-phase, used in an inner rotation type electric rotating machine.

Reference numerals 22a, 22b, 22c and 22d denote the electromagnetic iron cores which are formed by the sintering material and the lamination iron core and enclose effectively a bobbin coil 31a etc. Reference numeral 18 denotes a side plate which is formed by a non-magnetic body such as a stainless steel and constitutes strongly the respective electromagnets and at the same time combines mechanically the each phases of the electromagnet.

Figure 2C:
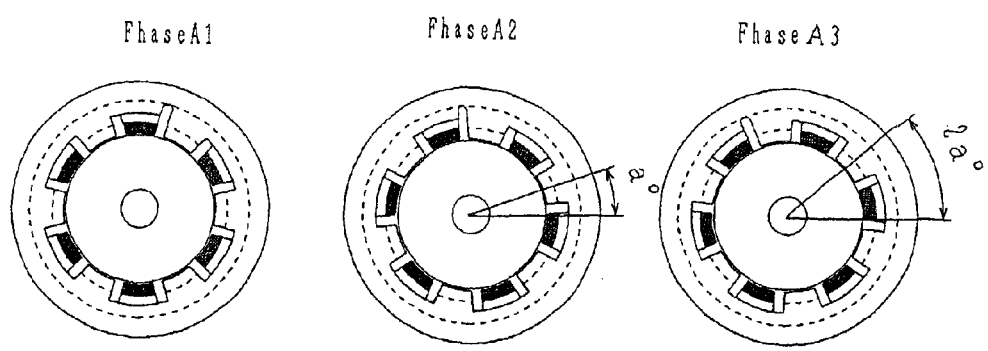
Figure 2D:
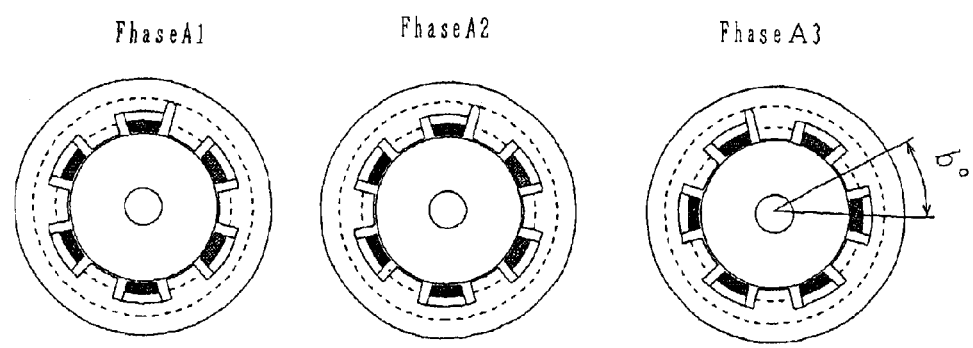

FIG. 2B is shows an example in which three electromagnets are constituted electrically at the same phase, FIG. 2C shows an example in which the each phase of the electromagnets is sifted electrically with the electric angle of a, and further FIG. 2D shows an example in which A1-phase and A2-phase are the same phase and A3-phase is shifted to the other phases with the electric angle of b.

Figure 4A:
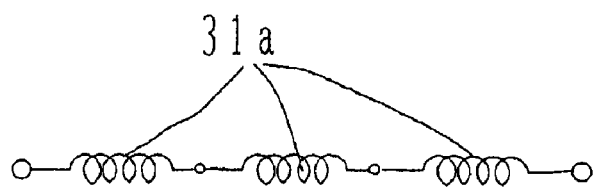
FIGS. 4A–4F are explanatory views of six examples of the coil connection between the respective phases of a single-phase stator having a bobbin type winding iron core.
Figure 4B:
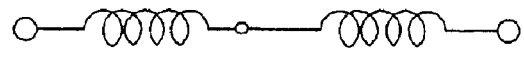
Figure 4C:
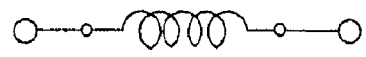

Each of FIGS. 4A–4F shows six examples of the connection of coil 31a between the respective phases of the single-phase stator. FIG. 4A is an example in which the coils of each phases are connected in series state, FIG. 4B shows an example in which the coil of the one phase among the three phases has in idle, and FIG. 4C is an example in which two coils have in idle.

Figure 4D:
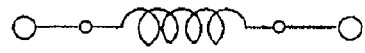
Figure 4E:
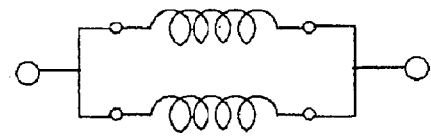
Figure 4F:
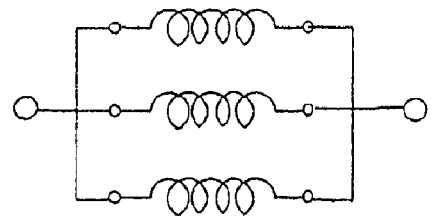

From FIG. 4E to FIG. 4F show examples the coils of the each phases are connected in parallel state, and FIG. 4D shows an example in which two coils among the three phases have in idle and substantially has the same result shown in FIG. 4C. FIG. 4E shows an example in which one coil among the three phases has in idle. FIG. 4F shows an example in which coils of all phases among the three phases are used in parallel state.

Figure 5A:
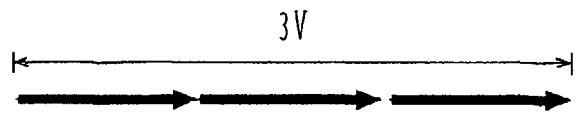
FIGS. 5A–5F are explanatory views showing a vector view of the electric generation voltage in a case where it is used as a generator accompanying with an arrangement of an electromagnet having a bobbin type winding iron core and various kinds connection manners of the coil.

Each of FIGS. 5A–5F shows a vector view of a generation voltage in a case in which an arrangement of the electromagnet of FIG. 2 and the various manners of the connections of FIG. 4 are used as the generator. FIG. 5A shows the generation voltage of a case where under the state of the arrangement of the three-phase and same phase of FIG. 2B the three-phase coil of FIG. 4A is connected in series state.

Figure 5B:
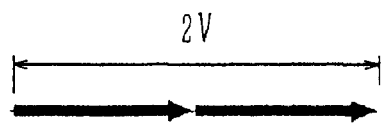
Figure 5C:
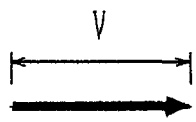

FIG. 5B and FIG. 5C show the examples of the generation voltages of the cases where under the state of the arrangement of the three-phase and same phase the one-phase coil or the two-phase coil has in idle.

Figure 5D:
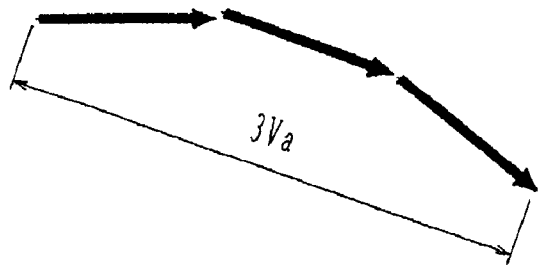
Figure 5E:
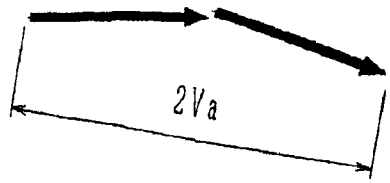
Figure 5F:
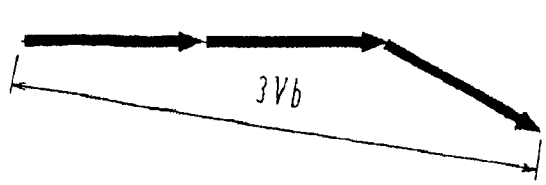

Each of FIG. 5D and FIG. 5E shows the example of the generation voltages of the cases where under the state of the shift of each phase of FIG. 2C. FIG. 5D shows the voltage of the case where the three-phase coil is connected in series state, and FIG. 5E shows the voltage of the case where the one-phase coil among the three-phase coil has in idle. FIG. 5F shows an example of the generation voltage the three-phase coil in the electromagnet of FIG. 2D is connected in series state.

In the above, they are exemplified as the examples of the generation voltages, relating to the currents under the case where the loads are connected, it is possible to carry out the various controls according to the arrangements of the electromagnets and the status of the connections of the coil.

Figure 3A:
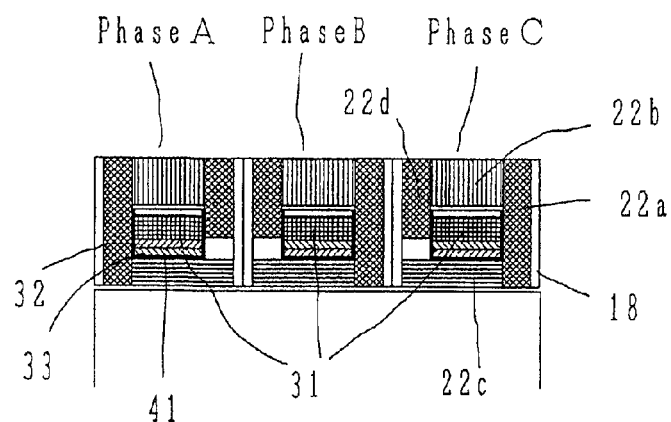
FIGS. 3A–3D are explanatory views showing concrete embodiments in which alternations in pole number of bobbin type electromagnets for constituting a stator or rotor are carried out easily.
Figure 3B:
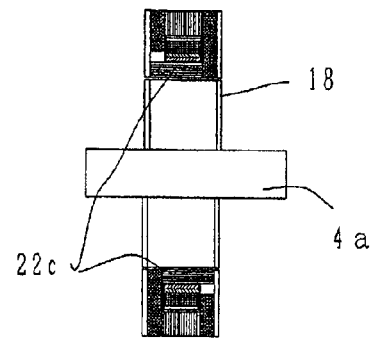

Each of FIG. 3A and FIG. 3B shows an explanatory view showing the concrete examples in which the alternations of the bobbin type electromagnet for constituting the stator or the rotor are carried out easily. By the mounting manners of the pole piece iron core 22c, when the electromagnet is N pole, it can alter simply from two-pole to N pole, or to adjust the number of the pole piece of the constituting the poles the electromagnet is constituted.

FIG. 3A shows a cross-sectional view of the bobbin type three-phase stator and this stator is constituted by the iron cores 22a, 22b, 22c which are formed by the lamination or the sintering and a pole piece 22d and they are sandwiched to side plates 18 and each of the phase is consisted independently. Since the iron cores 22a and 22d are formed that the polarity of the magnetic pole is altered freely, the polarity of the pole piece iron core 22c is altered at any installation place.

Accordingly, the alternation of the pole number can be carried out easily. Reference numerals 31, 32 and 33 denote a main coil of the each phase wounded on a bobbin insulating member 41 and a coil used for the magnetic engagement with the other phase.

Figure 3C:
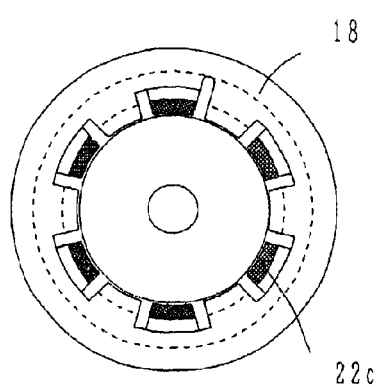
Figure 3D:
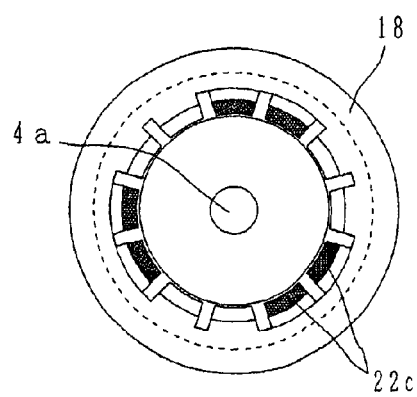

FIG. 3B shows a cross-sectional view for explaining the installation status of the different polarities of the pole piece iron core 22c and here the polarity of the upper portion and the polarity of the lower portion are different. Reference numeral 4a denotes a shaft. Each of FIG. 3C and FIG. 3D shows the example in which a stator having a twelve-pole and a stator having a six-pole are constituted, respectively.

Figure 6A:
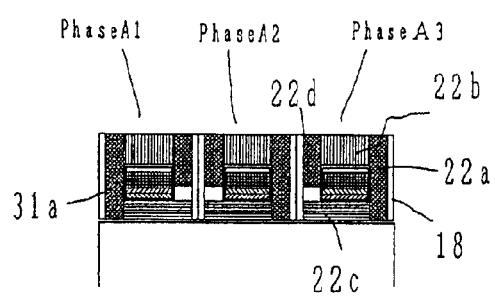
FIGS. 6A–6C are explanatory views showing a concrete structural example of a twelve-pole stator which is constituted by a single phase bobbin iron core.
Figure 6B:
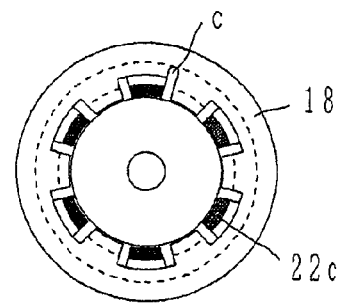
Figure 6C:
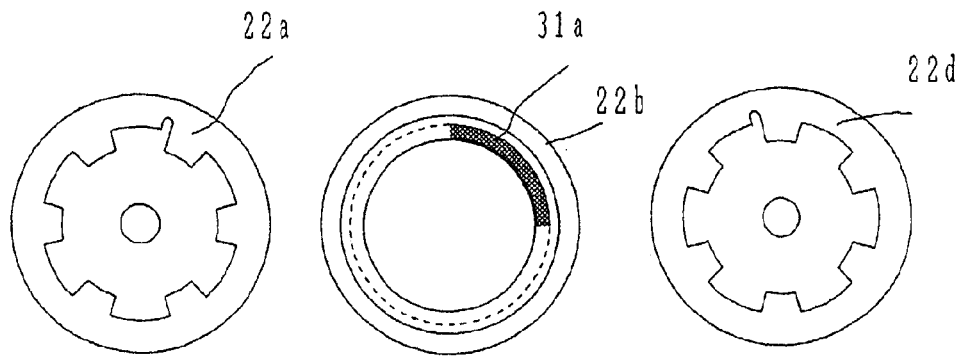
Figure 6C:
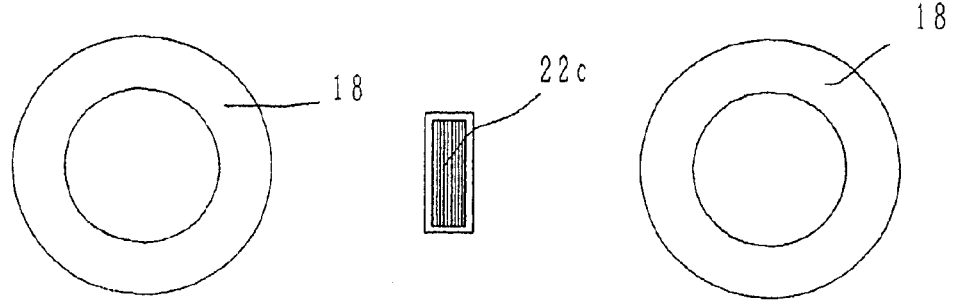

Each of FIG. 6A, FIG. 6B and FIG. 6C shows a view for explaining a concrete structure example of a twelve-phase stator constituted according to a single-phase bobbin iron core. FIG. 6A is a cross-sectional view of the stator and this stator is constituted by the iron cores 22a, 22b, 22c and 22d and a coil 31a, etc. FIG. 6B is a side view of the stator and windows C for drawing out to an outside the lead wires of the respective phase are provided.

FIG. 6C is an explanatory view showing one example of components of the twelve-phase electric rotating machine for constituting the stator and to inner diameter projection portions of the iron cores 22a and 22d six pole pieces 22c are installed and then the magnetic poles are formed. The formed magnetic pole and a bobbin-wounded coil 31a is enclosed by the iron core 22b and according to the two side plates 18 the stator of the each phase is formed sandwiched.

The pole piece iron core 22c is formed by the laminated iron cores shown in figure and this is enable to be formed by the sintering, the vessel type member in which the ferro-powder are enclosed, the thick ferro-piece member in which the thin groove is formed lengthily and laterally, and the iron core constituted by binding the thin steel wire and they are made by the materials in which the alternation loss is small to the alternating magnetic field. These iron cores can apply to the iron core 22c and also cab apply to other iron cores.

Figure 7A:
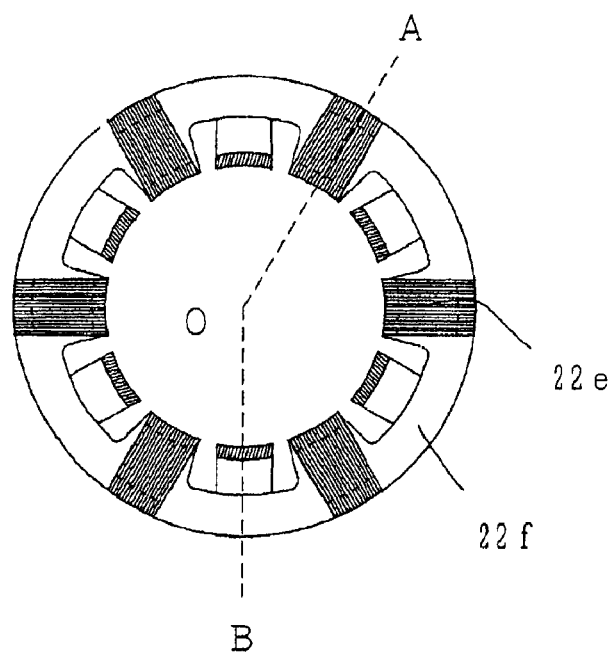
FIGS. 7A and 7B are explanatory views showing an example in which among iron cores used in a bobbin type winding wire a rear portion, a side portion and a pile piece portion of the iron core is formed integrally and it is suited to an alternation in pole number and capacity.
Figure 7B:
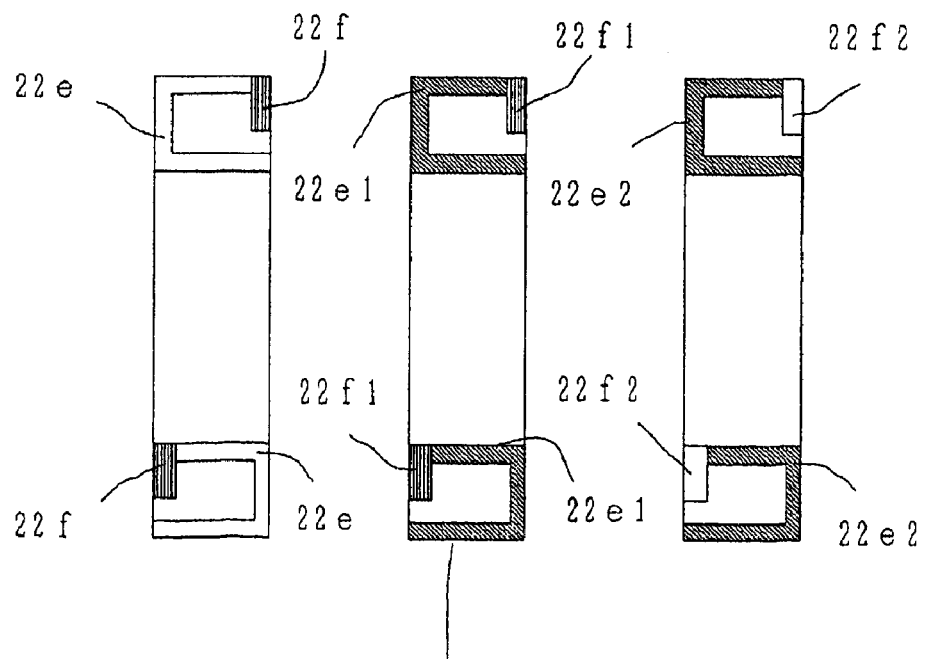

Each of FIG. 7A and FIG. 7B is an explanatory view of the stator construction in which among the iron cores used in the bobbin type winding a back portion and a side portion of the iron core and the pole piece portion are formed integrally and they are subdivided in the pole unit and formed by the lamination and sintering materials. Accordingly, the productivity performance is heightened remarkably in the various kinds and small amount production and in the mass production.

FIG. 7A shows an example of the stator of the twelve pole electric rotating machine which is constituted by the united cores and the iron core 22e is made by the steel plate which is formed by laminating with the necessary thick and making them as the unit and is arranged in the circumferential direction and further as the connection member between the iron cores it is constituted by the iron core 22f which is formed by the lamination and sintering materials.

FIG. 7B is an explanatory view of an example of A-O-B cross-section of FIG. 7A is formed by various kinds iron core materials and the materials of the iron cores 22e, 22e1, 22e2 and the connection iron cores 22f, 22f1, 22f2 are replaced with and combined by the lamination and sintering materials.

Figure 8A:
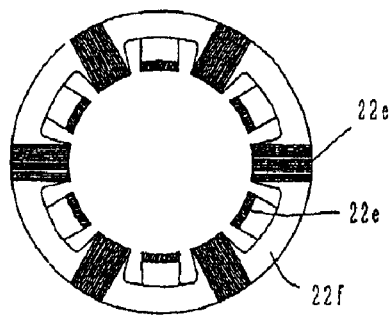
FIGS. 8A–8C are explanatory views showing a structure in which using an iron core element it is suited to correspond by one unit without an alternation in pole number and a largeness capacity in size.
Figure 8B:
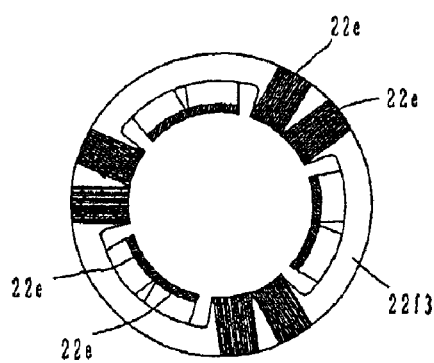
Figure 8C:
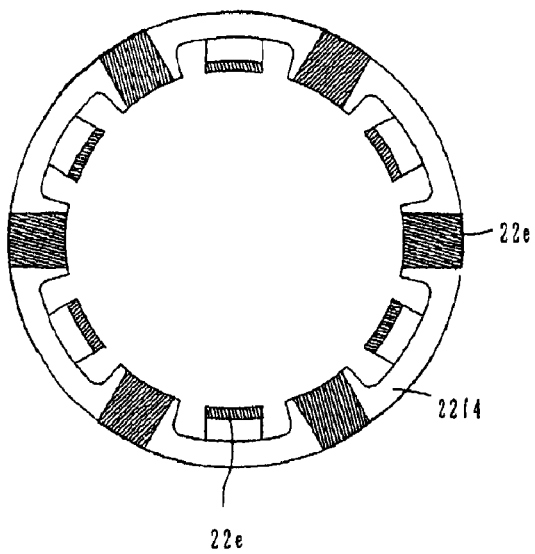

Each of FIG. 8A, FIG. 8B and FIG. 8C shows a structure in which using the unit iron cores explained in FIG. 7 the alternation of the pole number in the same size machine and apparatus and the laminated thickness of the unit iron cores and the alternation of the thickness and the individual number of the case of the lamination are carried out and then the size of the stator is altered freely and without the relationship of the capacity it can correspond by one unit.

Further it can correspond to the wide capacity machine and apparatus and at the same time even the small amount production the stator having the super productivity property can be provided.

FIG. 8A shows the stator which is constituted by the twelve-pole unit iron core 22e and the wedge iron core 22f explained in FIG. 7, and FIG. 8B shows an example a six-pole stator is formed by the unit iron core 22e and the connection iron core 22f.

FIG. 8C shows an example in which a twelve-pole stator is formed by the wedge iron core 22f4 by making large the laminated thickness of the iron core 22e. As stated in above, using one iron core unit, it can correspond the machine and apparatus having the wide range capacity and the various kinds pole number and then the machine and apparatus having the superior cost productivity performance is realized.

Figure 9A:
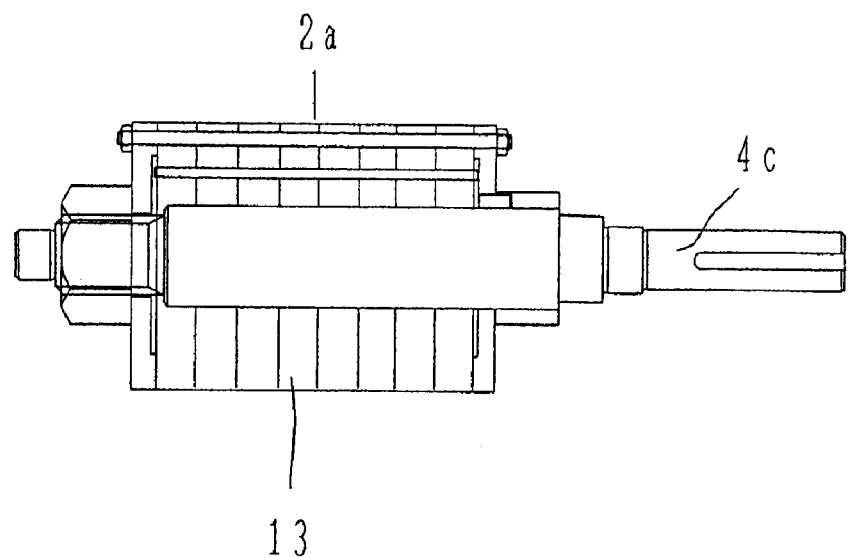
FIGS. 9A–9C are views showing an example an iron core element is subdivided in minimum and a magnet type rotor is formed.
Figure 9B:
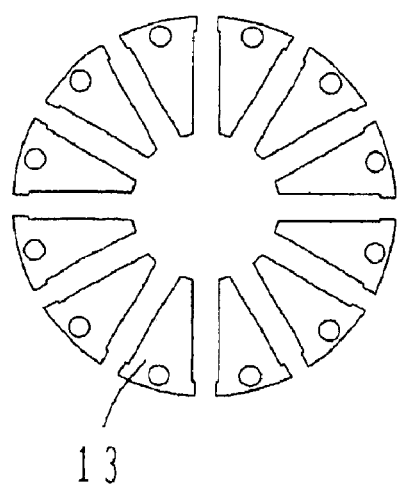
Figure 9C:
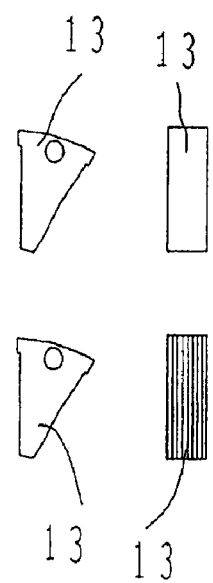

Each of FIG. 9A, FIG. 9B and FIG. 9C shows an example of the iron core in which the iron element 13 of the magnet type rotor is subdivided in the minimum and further is divided completely (for example, the twelve divisions) and according to the arrangement manner of the magnet, which is inserted into the slot formed between the iron cores, the alternation of the pole number is carried out easily and the cost of the special tool necessary for the production is made in the minimum.

Further by altering the outer diameter of the rotor without the largeness in size the rotor core enable to correspond the wide range machine and apparatus according to the combination of the elements. This iron core element may be manufactured as the block according to the forging work and the press working and it is formed by the thin steel plate in which the thickness is carried out by the lamination. Reference numeral 4c denotes the shaft.

Each of from FIG. 10A to FIG. 10D shows a view of a formation example in which using the iron core element 13 explained in FIG. 9 a two-pole, a four-pole, a six-pole and a twelve-pole of a rotor magnet iron core. To slots 50 formed between the iron core elements the magnets 14a and the magnetic body 60 such as an iron are combined and then the pole number alternation is carried out easily.

Figure 10A:
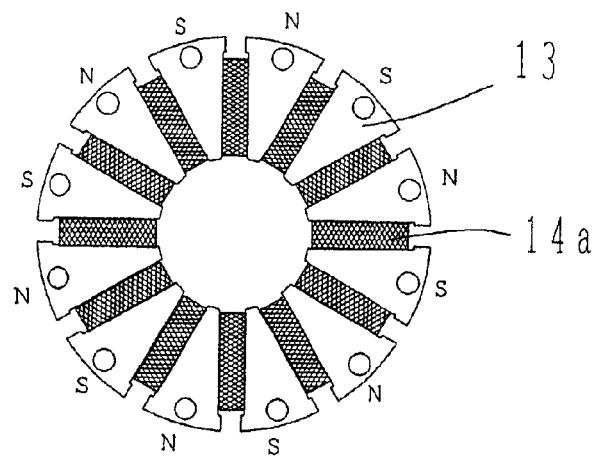
FIGS. 10A–10D are formation examples showing a two-pole, a four-pole, a six-pole and a twelve-pole rotor magnet iron core using an iron core element.
Figure 10B:
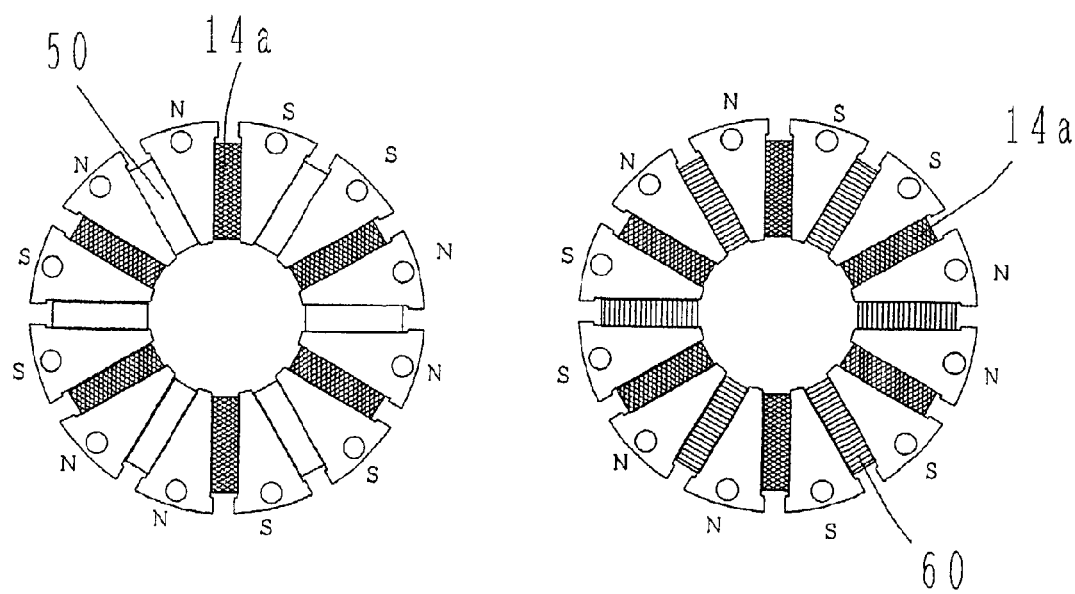

In FIG. 10A, to form alternatively the magnetic poles to the slots 50 the polarity of the magnets 14a is changed alternatively and the magnets are inserted, accordingly the twelve-pole rotor is formed. FIG. 10B is an example in which a six-pole rotor is formed, to the pole center slot, a space in which the magnetic body 60 is not inserted is formed and to a space the magnetic body is inserted. When the slot 50 is remained as the space is and there is inconvenient in the structure, the non-magnetic body or the magnetic body 60 may be inserted.

Figure 10C:
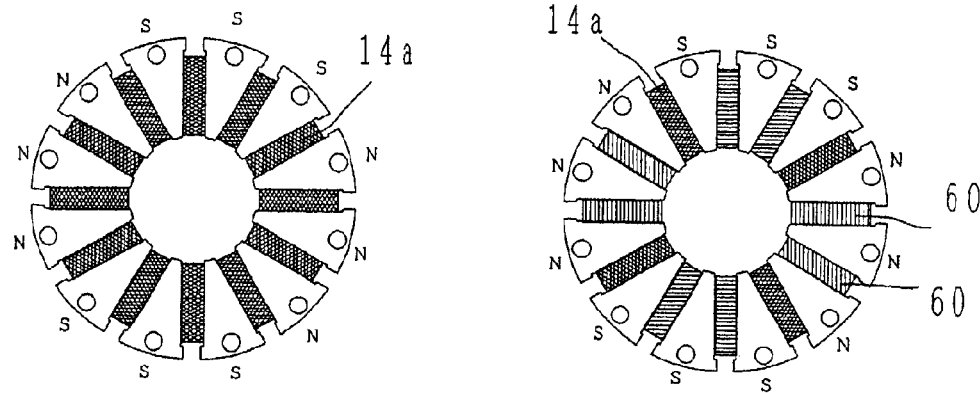

FIG. 10C is an example in which a four-pole rotor is formed. To all of the slots 50, the magnets 14a are inserted and a strong magnet rotor is formed or to the magnetic pole center portion using the two slots 50 the magnetic body 60, the magnet 14a and a weak magnet etc. are combined and then the magnetic field and the magnetic flux distribution etc. are adjusted and the voltage waveform of the characteristics of the generator are altered.

Figure 10D:
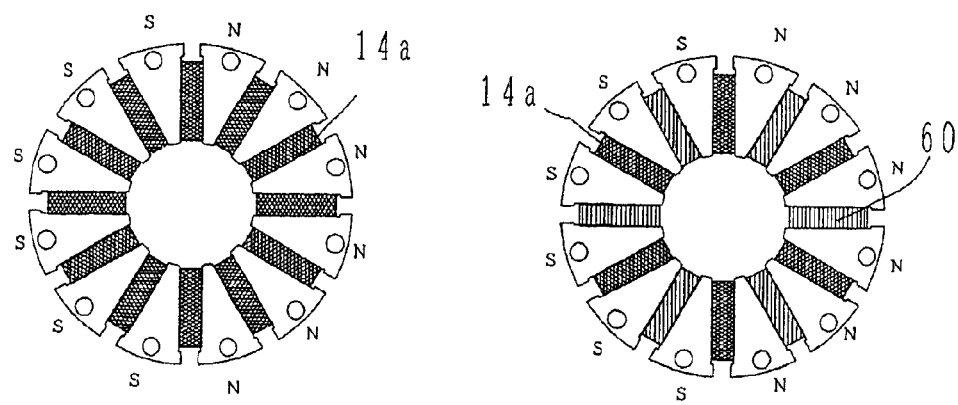

FIG. 10D shows an example of a two-pole rotor. The insertion of the magnet 14a and the practical use of the space of the magnetic body 60 and the slot is carried out by the above stated manner.

Figure 11A:
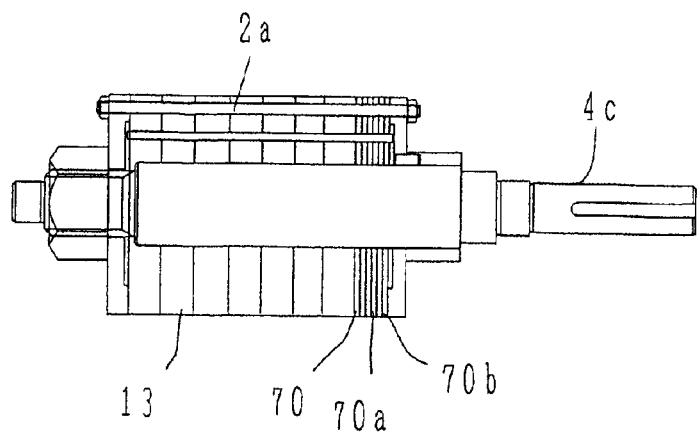
FIGS. 11A and 11B are explanatory views showing an adjustment example of characteristics using an adjustment plate of a magnetic body and a non-magnetic body using a space of one portion of an iron core.
Figure 11B:
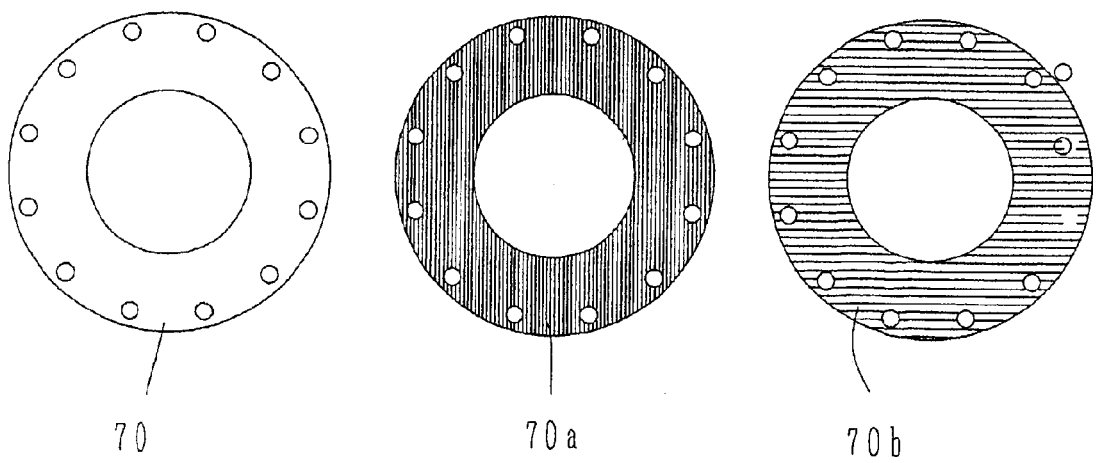

Each of FIG. 11A and FIG. 11B shows a view of a formation example in which using the iron core element 13 explained in FIG. 11A a two-pole, a four-pole, a six-pole and a twelve-pole of a rotor magnet iron core. For example, in a case where only the magnetic body is used according to the pole number to be used the manner of the magnetic short circuit between the magnetic poles changes and then the magnetic field of the air gap can be changed largely.

Further, when the magnetic shunt steel is employed, during the low temperature such as the start time since it works as the magnetic body, then it exhibits the effect for weakening the magnetic field of the air gap. However, when the temperature is arisen under the operation state it can not work as the magnetic body and it returns to the state in which the magnetic field is not adjusted, accordingly it is valid to lower only the start torque.

When the minute adjustment in the magnetic field is carried out, to between and the intermediate portion of the magnetic body 70 and the magnetic shunt steel 70a and the iron core 13 the non-magnetic body 70b may be inserted and then the adjustment is carried out.

Figure 12A:
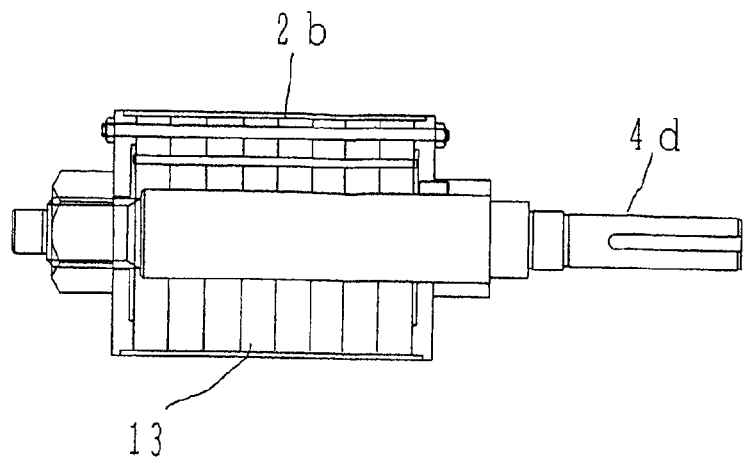
FIGS. 12A–12D are explanatory views showing an example in which a part of a module iron core is cut off and it is replaced with a magnetic body and a non-magnetic body and using a skew ring in which an end portion of a skew groove is cut off, a skew effect is obtained.
Figure 12B:
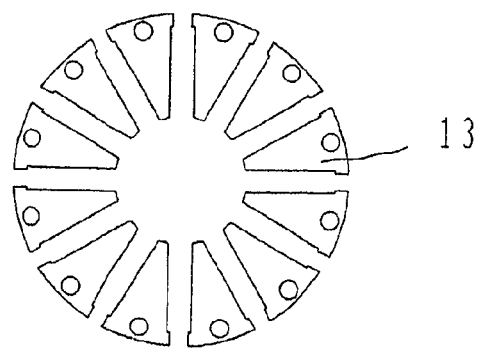
Figure 12C:
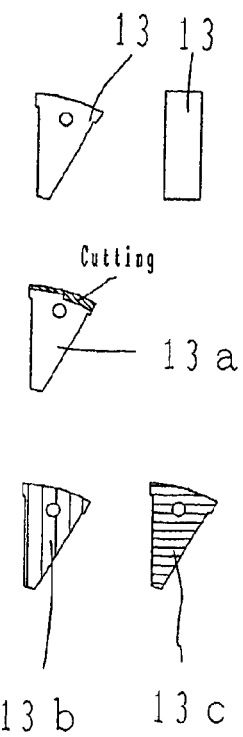

Each of from FIG. 12A to FIG. 12D shows an example in which the end portion members of the axial direction of the iron core 13 in FIG. 12B of the magnet rotor 2b of FIG. 12A are replaced with the magnetic shunt steel 13b having the same shape of the iron cores 13a in which a cut-off portion is provided on the portion facing to the air gap shown in FIG. 12C and the iron core 13 and the non-magnetic body 13c.

Figure 12D:
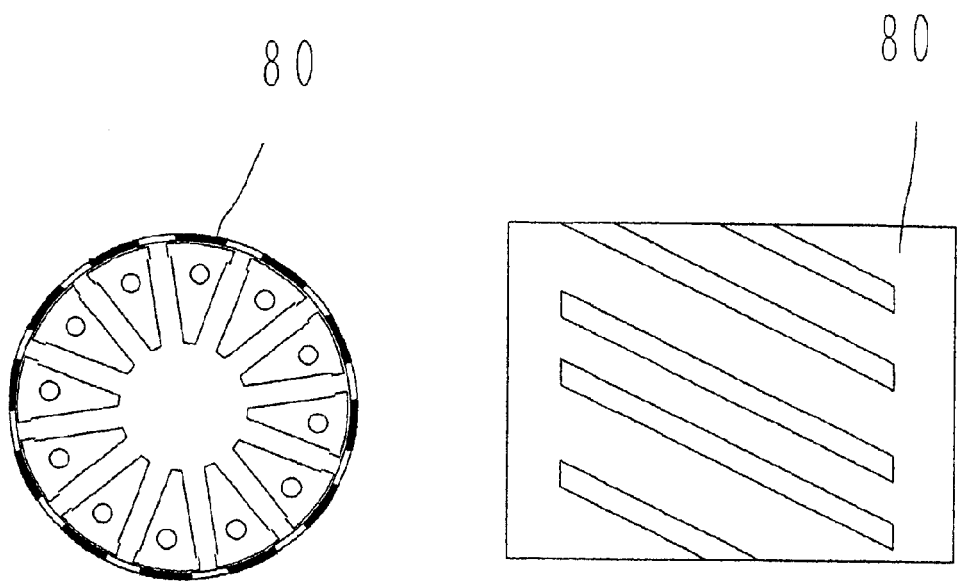
Figure 12D:
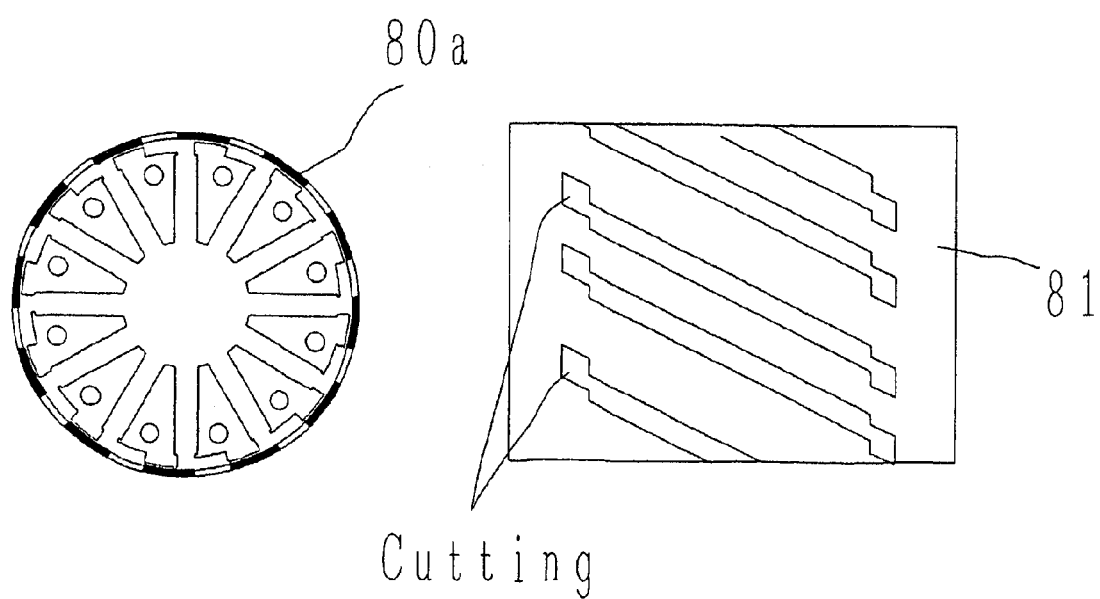

According to the mutual action between the end portion of the skew groove of a skew ring 80, which is provided on the outer face of the rotor shown in FIG. 12D and is made by the magnetic body, and a skew ring 80a having a cut portion which is cut off to obtain further the skew effect, the skew effect is increased further.

Figure 13A:
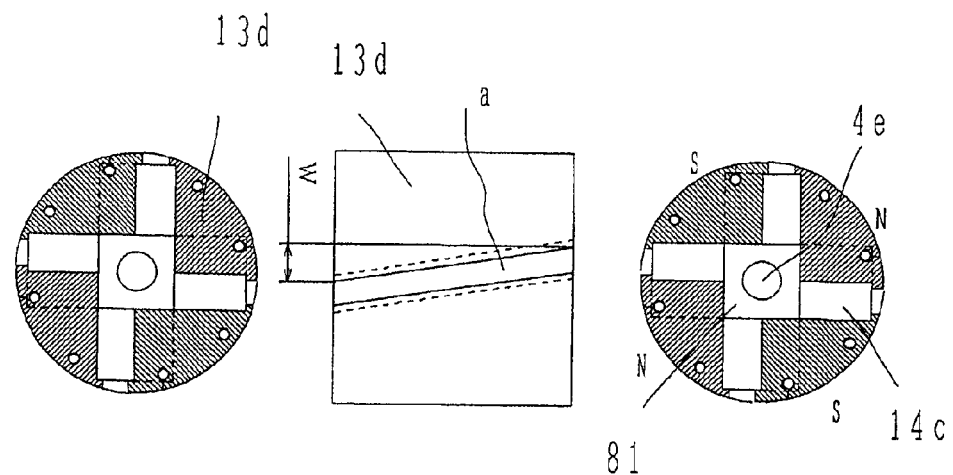
FIGS. 13A and 13B are explanatory views showing an example in which in a magnet insertion slot in an iron core a thin magnet and a wedge shape magnetic body are assembled and mounted, a skew effect is obtained remarkably further.
Figure 13B:
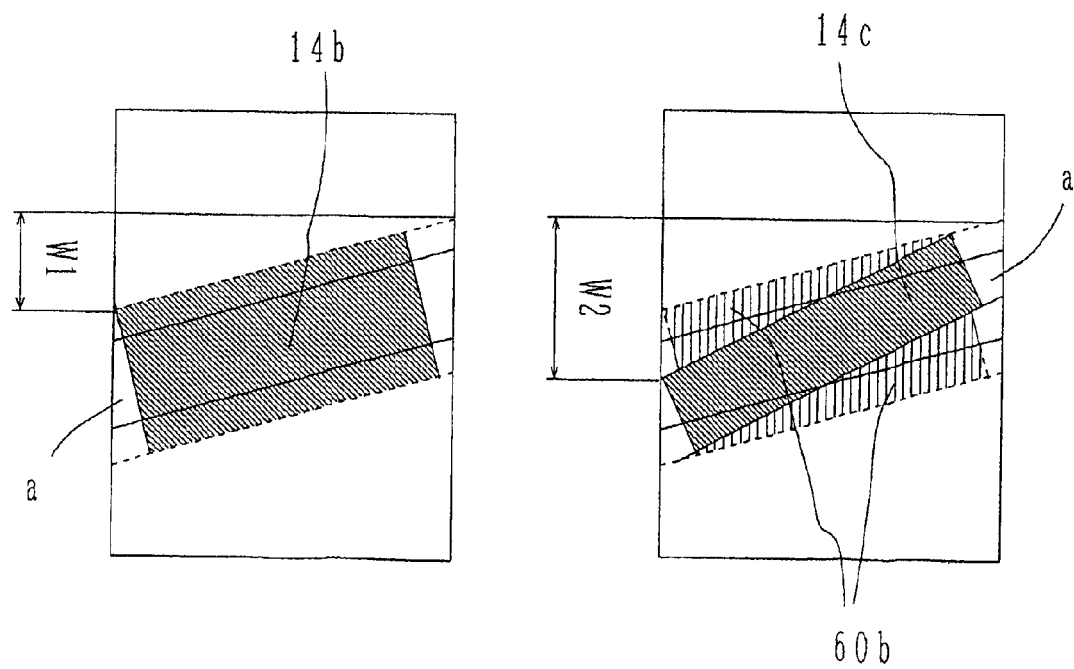

Each of FIG. 13A and FIG. 13B shows an example in which using a space of the magnets 14b which is inserted the slots a between the skewed iron cores 13 of the four-pole rotor shown in FIG. 13A, and to obtain further the skew effect, the magnets are replaced with the magnets 14b shown in FIG. 13B. The magnets 14c thinner than the magnet 14b and the wedge shape magnetic body 60b are combined and not to generate the gap they are inserted into the slots a, accordingly against a skew width W1 in the prior art a larger width W2 is obtained.

Figure 14A:
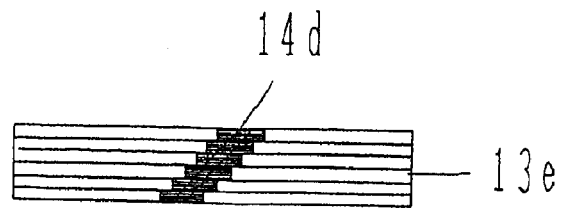
FIGS. 14A–14C are explanatory views showing an example in which an iron core and a magnet in a thickness of the iron core are assembled and a skew formation is carried out easily.
Figure 14B:
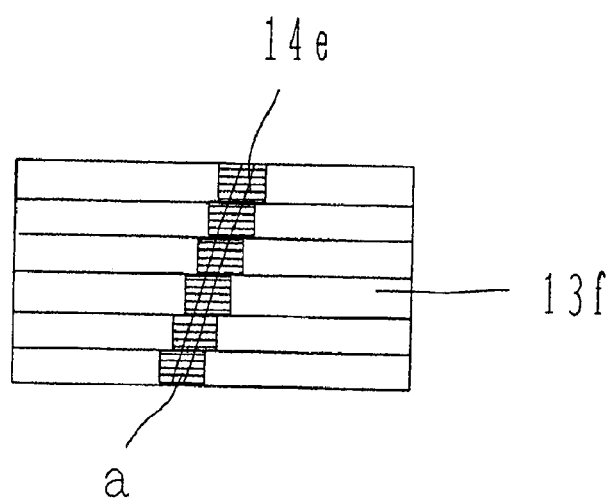
Figure 14C:
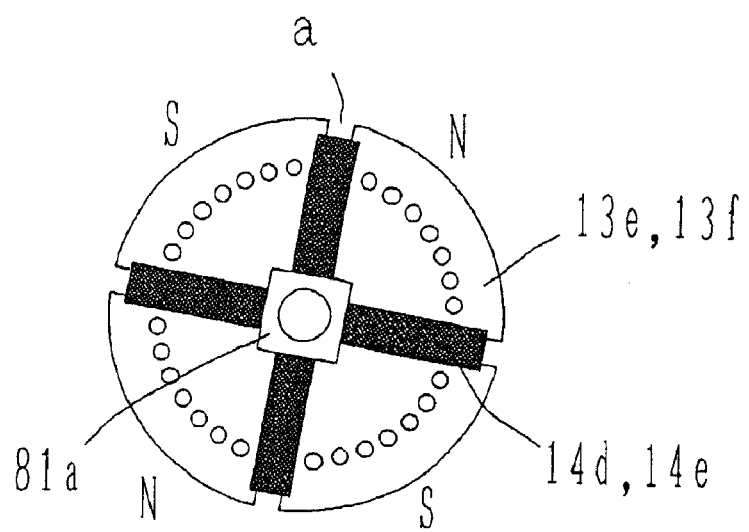

Each of FIG. 14A, FIG. 14B and FIG. 14C shows an example of a magnet rotor and a stator in which within a thickness of the iron cores 13e and 13f used in the magnet rotor and the stator a single number shown in FIG. 14A or plural number of the magnets 14d and 14e etc. shown in FIG. 14B which are mounted on a protein structure direction in the lengthwise, the lateral and the depth is constituted to be inserted to the slots a.

With this constitution, the delicate skew effect is carried out without the skewing and the strong and the distribution of the magnetic flux in the air gap are carried out and it can assemble simply with the low cost. The magnet is carried out the module performance in the minimum unit and only a single number it can use to much amounts, and the production cost of the magnet used in the single number is reduced about ⅙ degree.

This is the epoch-making idea which can be correspond to the production of the various range machine and apparatus kinds having the different size capacities and the quantity of the mounts. Reference numeral 81a denotes a non-magnetic body spacer. FIG. 14C is a cross-sectional view of the rotor.

FIGS. 15A–15B and FIGS. 16A–16C show examples of a magnet rotor and a magnet stator in which using the module and divided iron cores 13 and 13f the pole number alternation and the capacity alternation are carried out easily.

Figure 15A:
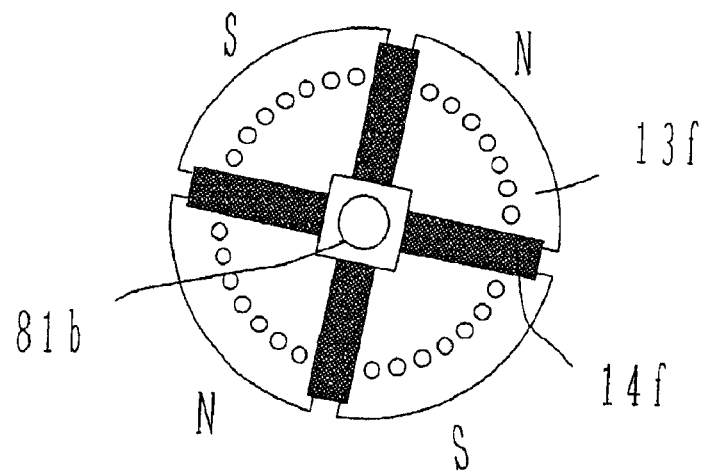
FIGS. 15A and 15B are views showing an example in which using a module iron core and a magnet a magnet type rotor having a different capacity and a stator are constituted.

Firstly, FIGS. 15A and 15B will be explained. FIG. 15A shows an example of four-pole rotor and the rotor is constituted by the module iron core 13f, the magnet 14f and the non-magnetic body 81b etc. and the rotor of an inner rotation type electric rotating machine and the stator of an outer rotation type electric rotating machine are exemplified.

Figure 15B:
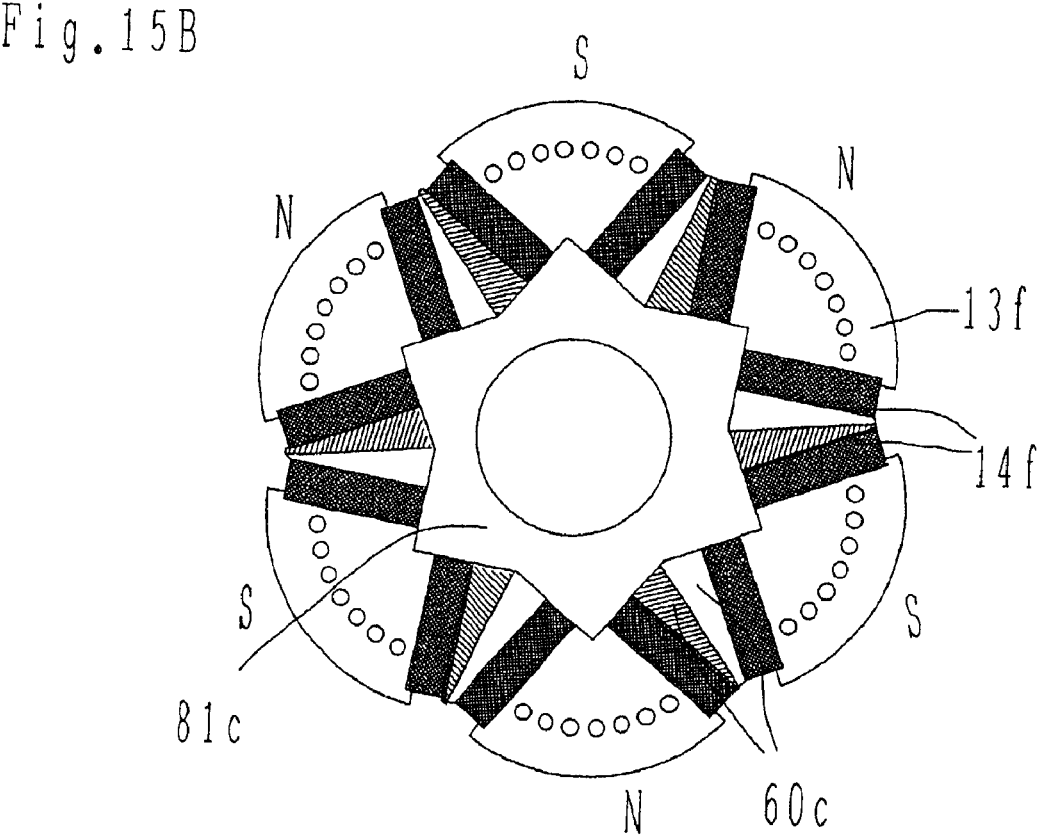

FIG. 15B shows an example in which using the module iron core 13f and the magnet 14f, the rotor having the large capacity about two times of the outer diameter and the stator are formed.

According to the magnet, the magnetic body 60c and the magnetic shunt steel etc., the space in the slot which is formed between two magnets 14f is buried and the loss in the magnetic field is prevented.

Figure 16A:
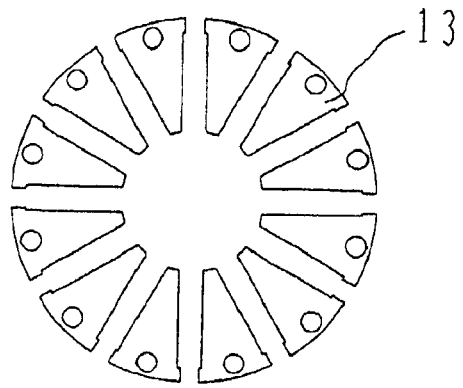
FIGS. 16A–16C are views showing another example in which using a module iron core and a magnet a magnet type rotor having a different capacity and a stator are constituted.
Figure 16B:
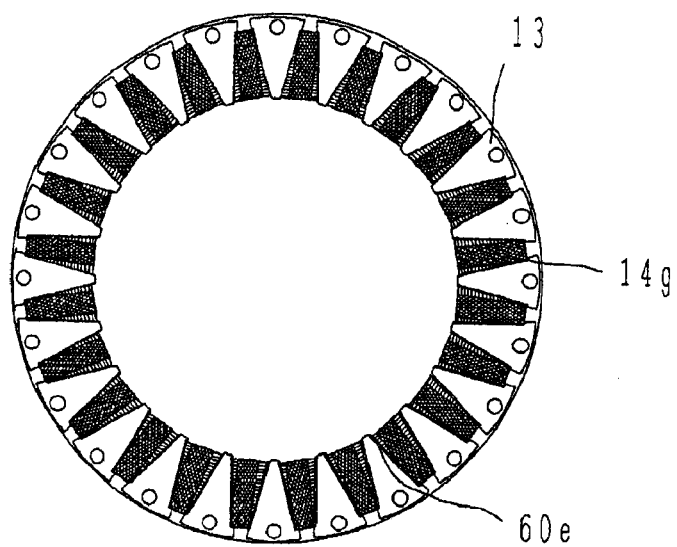

Next, FIGS. 16A–16C will be explained. FIG. 16A shows the module iron core 13 used for the rotor and the stator of a twelve-pole electric rotating machine, and FIG. 16B shows an example of the magnet rotor and the magnet stator in which the twenty-four iron cores 13 are used. Reference numeral 14g denotes a magnet, reference numeral 60e denotes a magnetic body, etc.

Figure 16C:
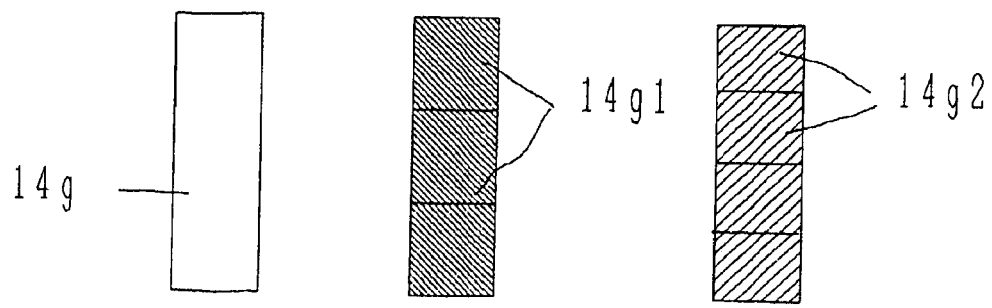

FIG. 16C shows an example of the construction of the magnet 14g and it is constituted by a single magnet or plural magnets such as three numbers or four numbers. In the case of a large size machine, by dividing lengthily and laterally and then the work performance is increased.

Figure 17A:
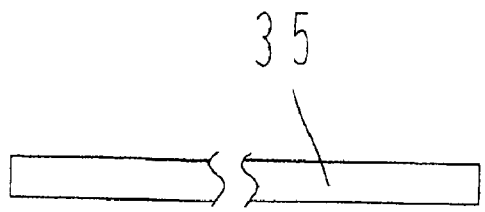
FIGS. 17A–17D are explanatory views showing a covered wire having a superior heat withstanding used in a winding wire.
Figure 17B:
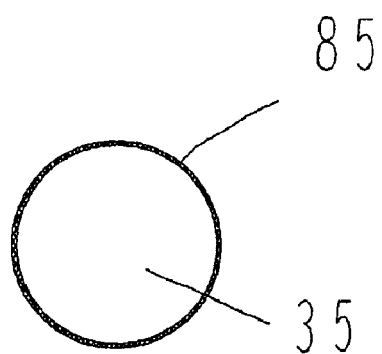

Each of from FIG. 17A to FIG. 17D shows an example in which, to improve the heat withstanding performance about two times in comparison with that of the prior art, an outer skin of the coil wire member 36 shown in FIG. 17A is covered by the heat withstanding member such as the alumina, the silica, and the silicone rubber, etc. FIG. 17B shows an example of a layer 85 in which the outer skin of the alumina wire member is treated by the eloxation processing.

Figure 17C:
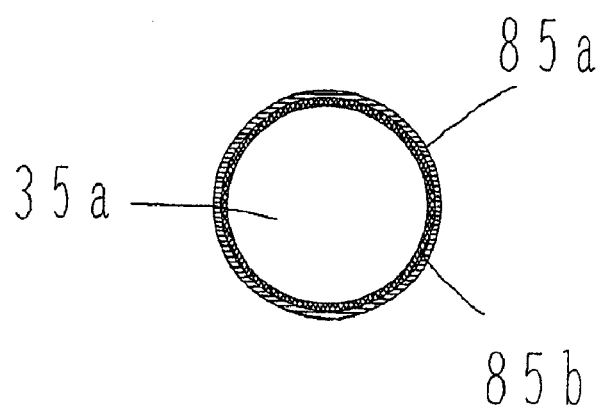
Figure 17D:
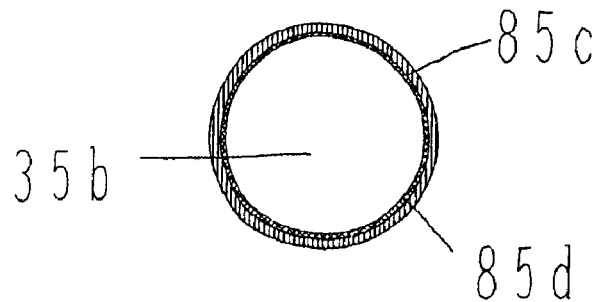

FIG. 17C shows an example in which to the wire 35a on which an eloxation film 85a is formed to increase further the insulating strength plural films 65b are formed using the same material and other materials. FIG. 17D shows an example in which to the outer skin of the wire member 35b after the silicone resin having the protein structure bridge etc. (under the nitrogen atmosphere and under the temperature of 1000° C., the reduction rate is 5%) have covered, the alumina and the silica are covered and the flexibility of the wire member is increased remarkably and at the same time the heat withstanding performance is obtained.

Reference numeral 35 denotes a wire member and reference numeral 85c denotes the heat withstanding resin such as the silicone resin and reference numeral 85d denotes a heat withstanding electric insulating body which is made by the alumina and the silica. The wire member having the good flexibility has the effects in which the electric wiring work of the winding wire etc. is carried out easily and it can endure fully against the vibration during the use time and the impact.

Figure 18A:
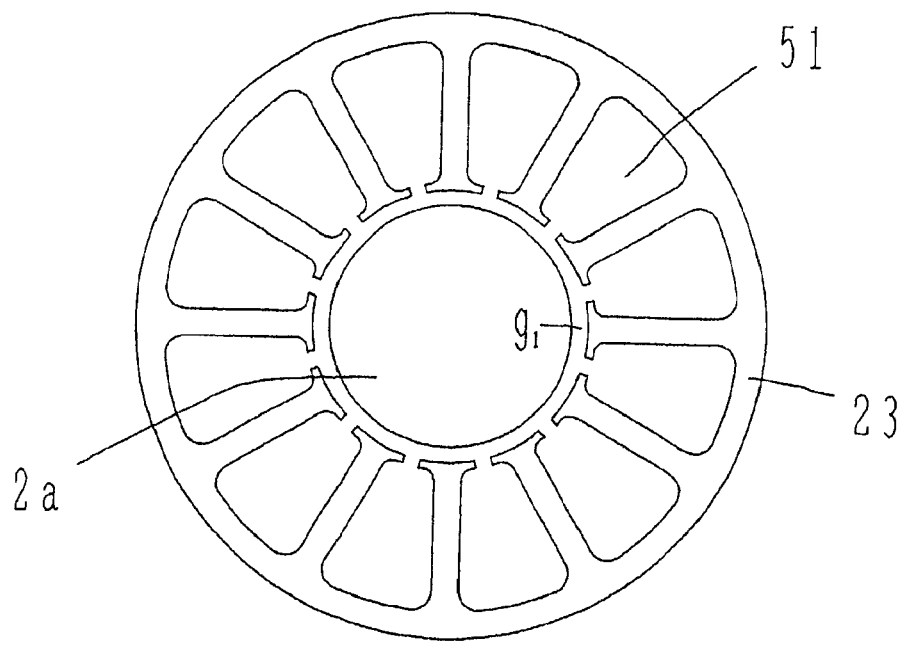
FIGS. 18A and 18B are explanatory views of an example of a stator in which an area of a winding wire slot for realizing a low output and a high efficiency is increased with a several times in comparison with that of the prior art.
Figure 18B:
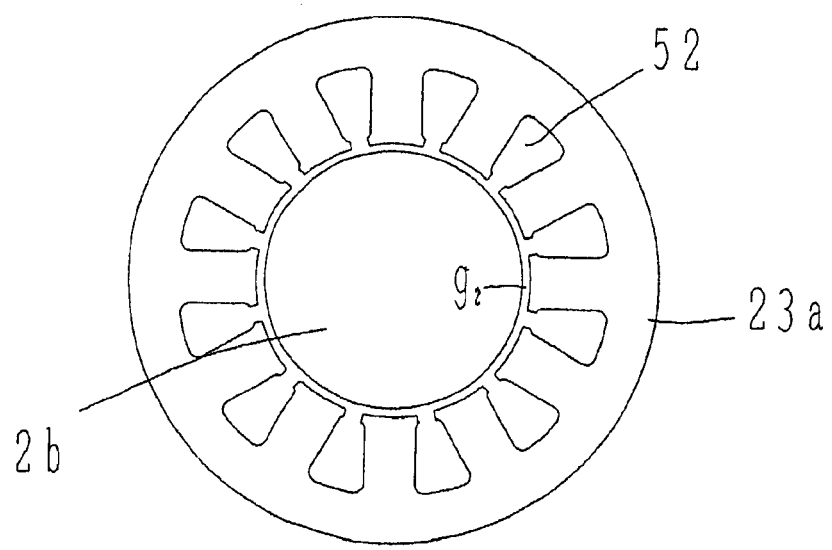

Each of FIG. 18A and FIG. 18B shows an example in which the air gap g1 between the stator iron core 23 having the several time winding slots in comparison with that of the prior art in which the start torque (1 gm) and the cogging are formed in the minimum or is not haven and the rotor 2a is formed wider at the 2–2.5 times of the air gap g2 between the stator iron core 23a and the rotor 2b shown in FIG. 18B.

To compensate the output which is reduced according to the air gap increase and the magnet strength adjustment by the increase of the winding wire, the slot 51 of the stator is formed larger and the minimum start torque and the efficiency during the low speed output time is increased remarkably (more than 95%) and then such an electric rotating machine is realized.

In the above case, since the large inertia is given to the rotation system, the efficiency is improved further near to 100%. Reference numeral 52 denotes a slot of the stator iron core in the conventional type, reference numeral 2b denotes a shaft.

Figure 19A:
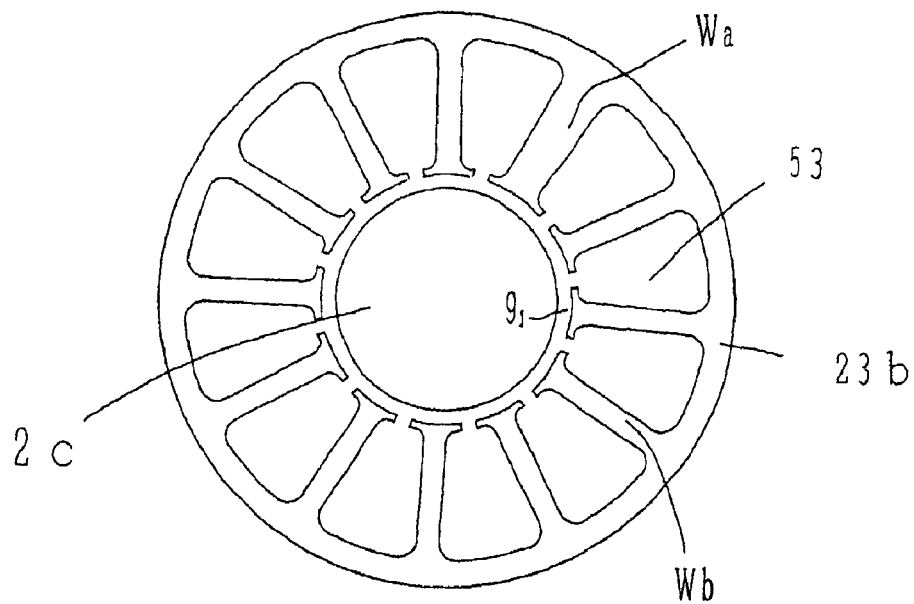
FIGS. 19A and 19B are explanatory views showing one example of a structure for realizing a low output and a high efficiency and for having a difference in phase between magnetic poles of a stator.

FIG. 19A shows an example in which to shift in phase the respective poles in the arrangement of the slot of the stator one portion of a width Wa of teeth portions of the electromagnet iron core 23b is formed wider than a width Wb of the other teeth portions.

Figure 19B:
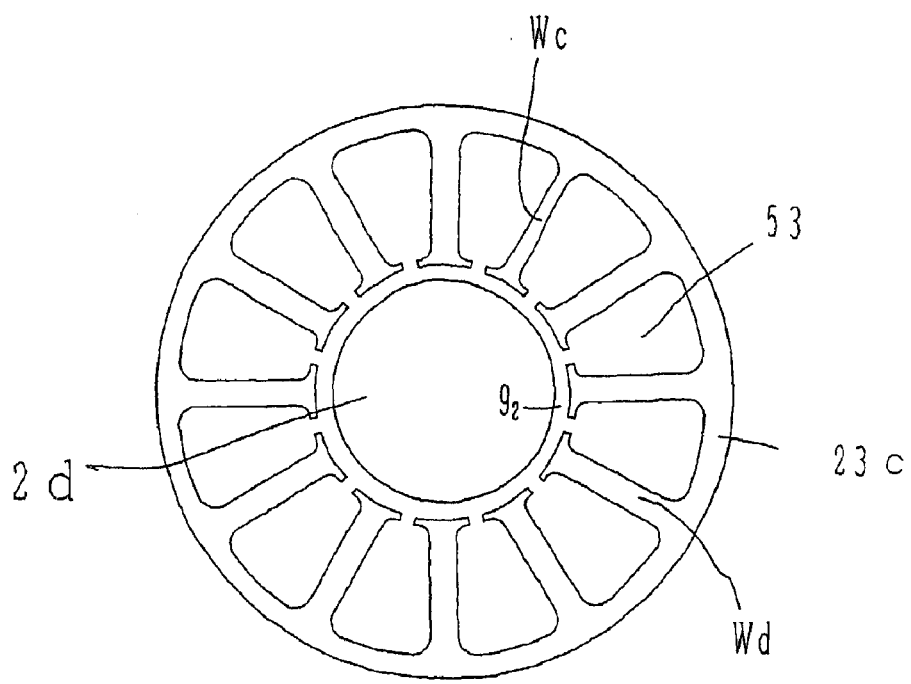

Further, FIG. 19B an example in which to shift in phase the respective poles in the arrangement of the slot of the stator one portion of a width Wc of teeth portions of the electromagnet iron core 23b is formed narrower than a width Wd of the other teeth portions.

Accordingly, without the formations of the skew of the rotor and the unbalance of the magnet arrangement the low start torque is realized and the efficiency during the low speed and the low output is improved remarkably (more than 95%) and then the electric rotating machine having the very small vibration noises is realized.

In particular, it is effective to the magnet type rotor. Reference numeral 53 denotes slots to which the winding is inserted. Reference numerals 2c and 2d denote rotors, and reference numeral g1 denotes an air gap.

Figure 20A:
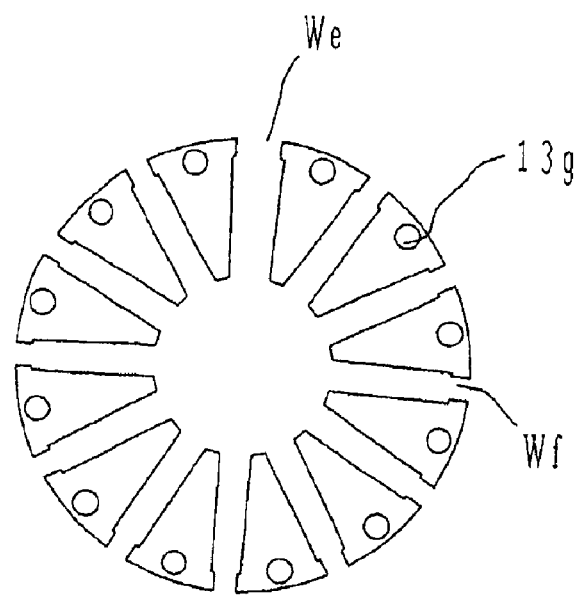
FIGS. 20A and 20B are explanatory views showing one example of a structure for realizing a low output and a high efficiency and for having a difference in phase between magnetic poles of a rotor.

FIG. 20A shows an example in which to shift in phase the respective poles in the arrangement of the slot of the stator one portion of a width We of the slit between adjacent magnet iron cores 13g is formed wider than a width Wf of the other slits.

Figure 20B:
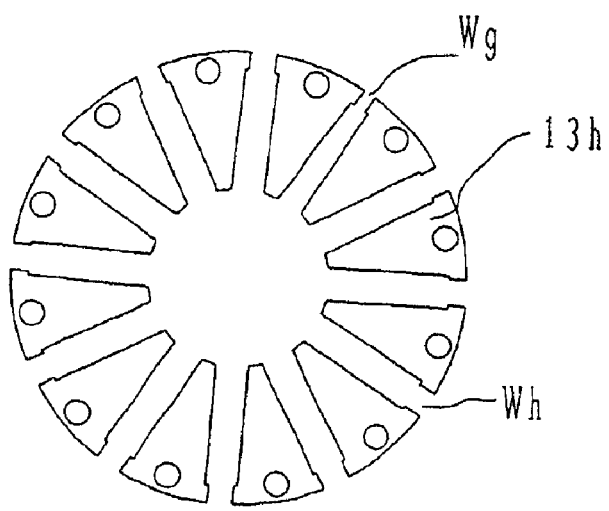

FIG. 20B shows an example in which to shift in phase the respective poles in the arrangement of the slot of the stator one portion of a width Wg of the slit between adjacent magnet iron cores 13h is formed narrow than a width Wh of the other slits.

Accordingly, without the formations of the skew of the stator and the unbalance of the magnet pole arrangement the low start torque is realized and the efficiency during the low speed and the low output is improved remarkably (more than 95%) and then the electric rotating machine having the very small vibration noises is realized.

In particular, it is effective to the magnet type rotor and it is effective to apply the iron core of the wound motor and a cage type rotor of the induction machine and to the integral type iron core.

Figure 21A:
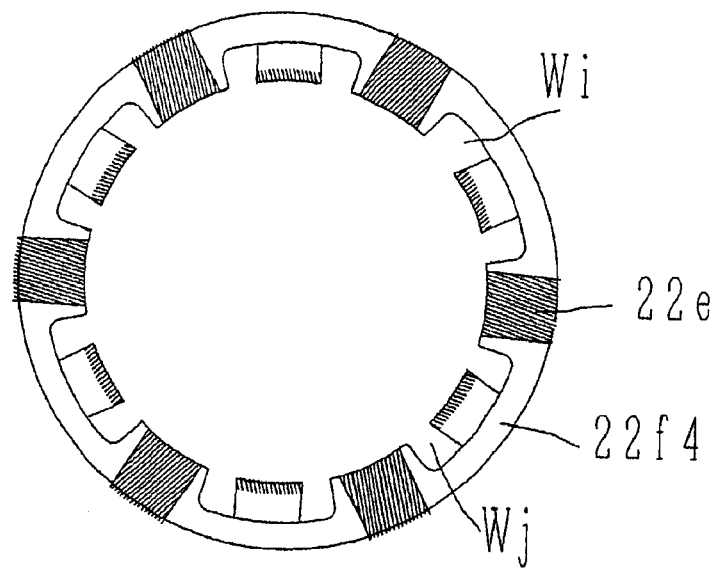
FIGS. 21A and 21B are explanatory views showing one example of a structure for realizing a low output and a high efficiency and for having a difference in phase between magnetic poles of a bobbin type winding stator.

FIG. 21A shows an example in which in which to shift in phase the respective magnetic poles of the arrangement of the bobbin winding type stator one portion of a width Wi between teeth portions of the electromagnet iron core 22e is formed wider than a width Wj between the other teeth portions.

Figure 21B:
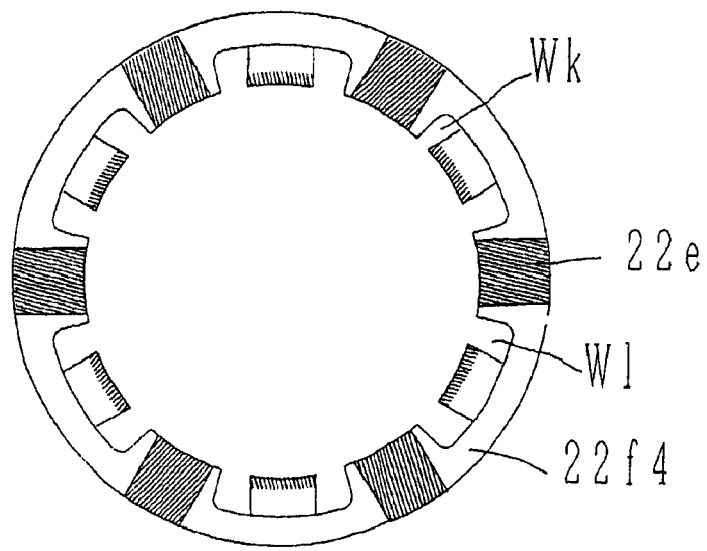

FIG. 21B shows an example in which in which to shift in phase the respective magnetic poles of the arrangement of the bobbin winding type stator one portion of a width Wk between teeth portions of the electromagnet iron core 22e is formed narrow than a width Wl between the other teeth portions.

Accordingly, without the formations of the skew of the stator and the unbalance of the magnet pole arrangement the low start torque is realized and the efficiency during the low speed and the low output is improved remarkably (more than 95%) and then the electric rotating machine having the very small vibration noises is realized.

In particular, it is effective to the magnet type rotor. As one manner for realizing this, it can realize simply by altering the length of one circumferential direction of the magnet iron core 22f4.

The present invention can apply in addition to the above stated various kinds machine and apparatuses to the other kinds electric rotating machines and also to the other embodiments different machine and apparatuses, such as a pancake type electric machine, a linear motor, an electromagnet machine and apparatus.

What is claimed is:

1. An electric rotating machine comprising:
 a bobbin winding iron core formed with a plurality of subdivided iron cores, wherein to make smoothly a flow of magnetic field of mutual poles, said iron cores are arranged in a radial direction along a perimeter of the bobbin winding iron core and are combined with connection iron cores to form plural combinations of coils and said iron cores, in which each combination has a same structure and same function, and wherein the plural combinations form at least substantially the same phase electrically; and
 wherein said iron cores along the perimeter each have a substantially C cross-sectional shape with a concave opening of the C cross-section shape facing in an axial direction of the electric rotating machine.

2. An electric rotating machine according to claim 1, wherein each of the iron cores has the same shape.

3. An electric rotating machine according to claim 1, wherein each of the connection iron cores has the same shape.

4. An electric rotating machine according to claim 1, wherein the iron cores are laminated cores.

5. An electric rotating machine according to claim 1, wherein the connection iron cores are laminated cores.

6. An electric rotating machine according to claim 1, wherein each of the connection iron cores respectively forms a wall abutted against the concave opening of the corresponding iron core.

7. An electric rotating machine according to claim 1, wherein ones of the connection iron cores each have a substantially annular sector shape.

8. An electric rotating machine according to claim 7, wherein the substantially annular sector shape includes a cut-out on one arc side thereof.

9. An electric rotating machine according to claim 8, wherein a middle portion of a given connection iron core abuts against one end of the C cross-sectional shape of a given iron core, and an opposite end of the C cross-sectional shape of the given iron core extends into the cut-out of the given connection iron core.

10. An electric rotating machine according to claim 9, wherein ends of the given connection iron core abut against neighboring ones of the iron cores of the bobbin winding iron core.

11. An electric rotating machine according to claim 1, wherein ones of the iron cores of a given bobbin winding iron core have the concave opening of the C cross-sectional shape facing in a first axial direction of the electric rotating machine, and wherein other ones of the iron cores of the given bobbin winding iron core have the concave opening of the C cross-sectional shape facing in an opposite axial direction of the electric rotating machine.

12. A bobbin winding iron core comprising:
 a plurality of subdivided iron cores, wherein to make smoothly a flow of magnetic field of mutual poles, said iron cores are arranged in a radial direction along a perimeter of the bobbin winding iron core and are combined with connection iron cores; and
 wherein said iron cores along the perimeter each have a substantially C cross-sectional shape with a concave opening of the C cross-sectional shape facing in an axial direction defined by a central axis of bobbin winding iron core.

13. A bobbin winding iron core according to claim 12, wherein each of the iron cores has the same shape.

14. A bobbin winding iron core according to claim 12, wherein each of the connection iron cores has the same shape.

15. A bobbin winding iron core according to claim 12, herein the iron cores are laminated cores.

16. A bobbin winding iron core according to claim 12, wherein the connection iron cores are laminated cores.

17. A bobbin winding iron core according to claim 12, wherein each of the connection iron cores respectively forms a wall abutted against the concave opening of the corresponding iron core.

18. A bobbin winding iron core according to claim 12, wherein ones of the connection iron cores each have a substantially annular sector shape.

19. A bobbin winding iron core according to claim 18, wherein the substantially annular sector shape includes a cut-out on one arc side thereof.

20. A bobbin winding iron core according to claim 19, wherein a middle portion of a given connection iron core abuts against one end of the C cross-sectional shape of a given iron core, and an opposite end of the C cross-sectional shape of the given iron core extends into the cut-out of the given connection iron core.

21. A bobbin winding iron core according to claim 20, wherein ends of the given connection iron core abut against neighboring ones of the iron cores of the bobbin winding iron core.

22. A bobbin winding iron core according to claim 12, wherein ones of the iron cores of a given bobbin winding iron core have the concave opening of the C cross-sectional shape facing in a first axial direction of the electric rotating machine, and wherein other ones of the iron cores of the given bobbin winding iron core have the concave opening of the C cross-sectional shape facing in an opposite axial direction of the electric rotating machine.

23. An electric rotating machine comprising:

a bobbin winding iron core including a plurality of subdivided iron cores, wherein to make smoothly a flow of magnetic field of mutual poles, said iron cores are arranged in a radial direction along a perimeter of the bobbin winding iron core and are combined with connection iron cores; and wherein said iron cores along the perimeter each have a substantially C cross-sectional shape with a concave opening of the C cross-sectional shape facing in an axial direction defined by a central axis of bobbin winding iron core.

* * * * *